Oct. 4, 1927.

C. J. RODRIGUEZ 1,644,449

CULTIVATING IMPLEMENT

Original Filed Sept. 9, 1925

INVENTOR.
Celso J. Rodriguez
BY
ATTORNEY

Patented Oct. 4, 1927.

1,644,449

UNITED STATES PATENT OFFICE.

CELSO J. RODRIGUEZ, OF WELLS, MINNESOTA.

CULTIVATING IMPLEMENT.

Application filed September 9, 1925, Serial No. 55,234. Renewed August 24, 1927.

This invention relates to improvements in cultivator implements, and it is the principal object of the invention to provide a grass removing implement having a plurality of adjustable, angular blades.

Another object of the invention is the provision of an implement of this type adapted to be readily secured to any cultivator now in use.

A further object of the invention is the provision of a grass remover of simple and inexpensive construction yet durable and efficient in its work.

A still further object of the invention is the provision of an implement of this type allowing an adjustment of the angle at which the implement blades are meeting in their middle part.

It is also one of the objects of the invention to provide a grass removing implement adapted to remove the surface grass and to cultivate the soil thereunder comprising novel and improved means for adjusting the angle at which the cutter blades are arranged.

These and other objects and advantages of the invention will become more fully known as the description thereof proceeds, and will then be more specifically defined in the appended claim.

In the accompanying drawing, forming a material part of this disclosure:

Figure 1:
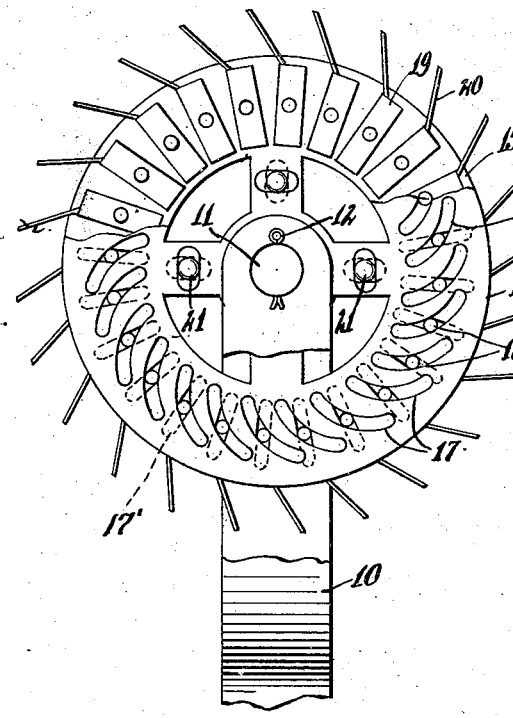
Fig. 1 is a side elevation of an implement constructed according to the present invention.
Figure 2:
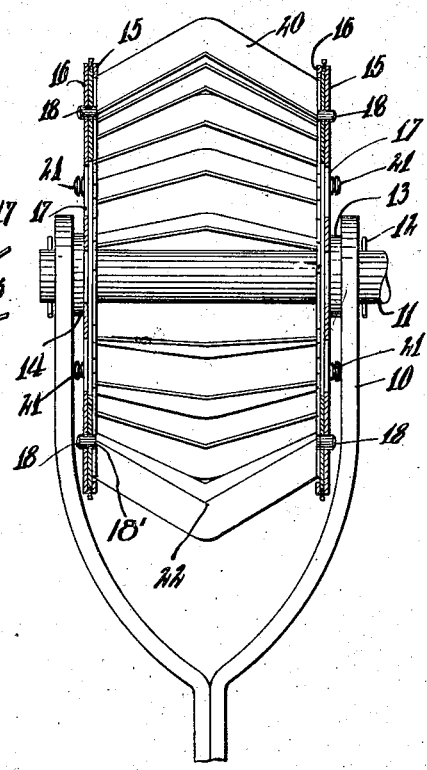
Fig. 2 is an end view thereof.

The cultivator implement comprises a fork 10 adapted to be attached with its lower end to any part of the cultivator on which the device is to be used in the ordinary well known manner. A shaft 11 is journaled between the prongs of the fork 10 transversely and horizontally disposed thereto, and is held in place by means of cotter pins 12 passed through its ends. On said shaft, near the inner faces of the prongs, and separated therefrom by collars 13 and 14 are secured a pair of discs 15 and 16 on each side. The outer of said pair of discs being provided with a plurality of curved slots 17 in which pins 18 travel which project from a plurality of sockets 19 between the outer and inner disc. An inward extension 18' of the pin 18 extends through straight radial slots 17' in the inner disc 16. A plurality of angular cutter blades 20 are held in the sockets between each pair of discs by means of the clamping action of the screws 21 or the like, and the apexes of the angles of the cutter blades are located in approximately the middle between the two pairs of discs as indicated at 22.

When it is desired to change the adjustment of the angular cutter the screws 21 may be loosened to permit movements of the sockets 19 for changing the inclination of the sockets 19 and the cutter blades held therein. When the screws 21 are loosened the disc may be rotated relative to each other for moving the sockets and blades outwardly or inwardly with respect to the center of the discs 15 and 16. It will be seen in Fig. 1 that as the outer disc is rotated in a counter clockwise direction the pins 18 will be moved inwardly whereas a clockwise movement of the outer disc will cause the blades to be moved outwardly. When the blades have been suitably adjusted the screws 21 may be tightened to clamp the sockets in place between the two discs. The combination of the curved and straight slots affords an adjustment which will position all the sockets 19 at equal distance from the center of the disc.

Having thus described my invention, what I claim as new, and desire to secure by Letters Patent is:

A cultivator implement of the class described comprising a fork, a shaft journaled in the prongs of said fork, said fork adapted to be attached to a cultivator, pairwise arranged discs, the outer of each pair having a plurality of curved slots therein. the inner disc having straight radial slots therein, pins adapted to travel in said slots, said slots being adapted to co-operate in uniformly positioning said pins upon relative movement of said discs, sockets secured to said pins, a plurality of curved cutter blades held by said sockets, having their apexes in approximately the middle between said prongs, and means for adjusting and locking the discs in their adjusted positions.

In testimony whereof I have affixed my signature.

CELSO J. RODRIGUEZ.